Sept. 19, 1967    M. PYLYPYSHYN    3,342,235
ASSEMBLED THREADED FASTENER UNITS
Filed Jan. 25, 1966

Inventor
MICHAEL PYLYPYSHYN
By Samuelson & Jacob
His Attorneys

United States Patent Office 3,342,235
Patented Sept. 19, 1967

3,342,235
ASSEMBLED THREADED FASTENER UNITS
Michael Pylypyshyn, Bloomfield, N.J., assignor to Triangle Tool Company, Union, N.J., a corporation of New Jersey
Filed Jan. 25, 1966, Ser. No. 522,914
7 Claims. (Cl. 151—37)

ABSTRACT OF THE DISCLOSURE

An assembled threaded fastener unit in which a toothed lock washer is maintained in assembled relationship with a threaded fastener, such as a nut or a screw, by means of a flange at one periphery of an annular body portion of the lock washer engaging corresponding means at the mouth of a recess in the body of the threaded fastener, the annular body portion having a frusto-conical configuration, the lock washer having locking teeth projecting radially from the other periphery of the annular body portion, and the threaded fastener having a clamping surface coextensive with at least a portion of the locking teeth and a frusto-conical surface extending between the clamping surface and the recess, the frusto-conical surface of the fastener member having the same apical angle as that of the annular body portion of the lock washer and a radial extent corresponding to the radial extent of the annular body portion between the peripheries thereof.

---

The present invention relates generally to assembled threaded fastener units of the variety in which a lock washer is maintained in assembled relationship with a threaded fastener member and to fastener members employed in such assemblies. More specifically, the invention is concerned with an improvement in the configuration of the assembly, and particularly in the configuration of the fastener member employed in the assembly.

The demonstrated effectiveness of toothed lock washers when used in combination with threaded fastener members has given rise to an increased demand for assembled threaded fastener units in which toothed lock washers are permanently fixed to threaded fastener members. The increased demand has been accompanied by a search for simplified constructions which would enhance the operating effectiveness of such assemblies while maintaining ease of manufacture at relatively low cost.

It is therefore an object of the invention to provide an improved configuration in an assembled lock washer and threaded fastener unit, which configuration allows ease of manufacture and effectiveness of operation.

Another object of the invention is to provide an improved assembled lock washer and threaded fastener unit wherein the lock washer is freely rotatable with respect to the threaded washer member and wherein the lock washer body is in such close proximity to the fastener member body as to be supported and reinforced thereby over a relatively large portion of the area of the lock washer body.

A further object of the invention is to provide a threaded fastener member having a body configuration capable of receiving and supporting a lock washer in appropriate assembled relationship therewith, the body configuration having a surface for supporting and reinforcing a relatively large complementary body portion of the lock washer.

A still further object of the invention is to provide a threaded fastener member for use in an assembled toothed lock washer and threaded fastener assembly wherein the fastener body has a clamping surface coextensive with at least a portion of the locking teeth of the washer, the coextensive portion lying nearer to a cooperating workpiece surface, when the assembly is in cooperative engagement therewith, than any further portion of the fastener body which is coextensive with further portions of the lock washer body.

The above objects, as well as further objects and advantages, are attained in the present invention which may be described briefly as an assembled lock washer and threaded fastenerd unit wherein the lock washer is maintained in assembled relationship with the fastener adjacent a lower surface thereof, the lock washer being positively retained against disassembly from the fastener and readily rotatable relative thereto, the unit comprising a fastener member including a body having an outer periphery and an axially extending screw-threaded portion displaced radially inwardly of the outer periphery, the lower surface of the body extending between an inner boundary at the screw-threaded portion and an outer boundary at the outer periphery, the lower surface including a recess having a lowermost mouth and extending axially upwardly into the body from the mouth and radially from one of the lower surface boundaries toward the other of the lower surface boundaries to an axially directed peripheral margin, a clamping surface lying in a generally radial plane displaced axially below the mouth of the recess and extending from the other of the lower surface boundaries toward the one of the lower surface boundaries, and a frusto-conical surface extending upwardly from the clamping surface to the mouth of the recess, the frusto-conical surface defining an apical angle. The unit includes a lock washer having a unitary body with a central opening and an outer periphery and including therebetween a first, generally annular, frusto-conical body portion extending between radially inner and outer peripheries and being generally coextensive with the frusto-conical surface of the fastener member, the first body portion of the lock washer having a radial extent and an apical angle corresponding to the radial extent and apical angle of the frusto-conical surface of the fastener member body, a second body portion integral with one periphery of the first body portion and extending generally axially therefrom upwardly through the mouth of the recess in the lower surface of the fastener member body, the second body portion including a flange displaced axially above the first body portion and projecting radially toward the other periphery of the first body portion and toward the peripheral margin of the recess, and locking teeth integral with the other periphery of the first body portion, projecting radially therefrom at least partially coextensive with the clamping surface of the fastener member and being twisted relative thereto to present upper and lower locking edges displaced axially from the first body portion. Means are provided integral with the fastener member body at the mouth of the recess therein and projecting radially beneath the flange of the second body portion of the lock washer for retaining the lock washer against disassembly from the fastener member. The apical angle of the first body portion of the lock washer and the corresponding apical angle of the frusto-conical surface of the fastener member body are chosen to maintain the upper locking edges of the locking teeth of the lock washer below the radial plane of the clamping surface and clear of the clamping surface to permit rotation of the lock washer relative to the fastener member. The invention further contemplates a fastener member having a configuration as described above for use in an assembled lock washer and threaded fastener unit as described above.

The novel features of the invention, as well as additional objects and advantages thereof, will be more fully understood from the following detailed description of embodiments of the invention illustrated in the accompanying drawings, in which.

Figure 1:
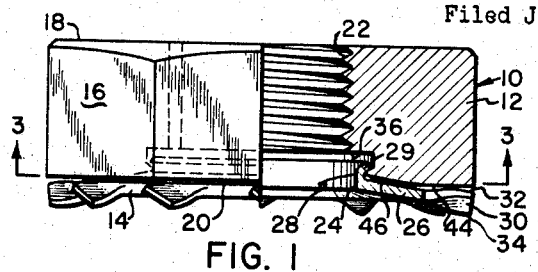
FIGURE 1 is an elevational view, partially sectioned, of an assembled lock washer and threaded fastener unit constructed in accordance with the invention and wherein the fastener member is a nut and the lock washer is an external toothed lock washer.
Figure 2:
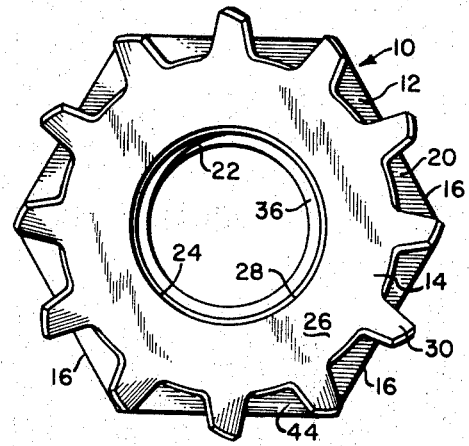
FIGURE 2 is a bottom plan view of the unit of FIGURE 1.

Referring to the drawings, an assembled threaded fastener and lock washer unit of the invention is illustrated at 10 in FIGURES 1 and 2 and is seen to be comprised of a threaded fastener member shown in the form of a nut 12 and a toothed lock washer shown in the form of an external tooth lock washer 14.

Nut 12 has a solid, unitary body of standard hexagonal outer configuration providing six wrench faces 16 along the outer periphery of the nut body, which faces extend axially between upper and lower radially extending surfaces 18 and 20, respectively. A screw-threaded portion is shown in the form of a centrally located threaded aperture 22 which extends axially between the upper and lower surfaces 18 and 20 so that these surfaces each have radially inner and outer boundaries defined by the threaded aperture 22 and the outer periphery of the nut body, respectively.

Lock washer 14 has a unitary body with a central opening 24, which is generally coaxial with aperture 22 of the nut, a first body portion 26, which is generally annular in that it extends between radially spaced inner and outer peripheries, and a second body portion 28 integral with the first body portion at the inner periphery thereof and extending axially upwardly therefrom. Second body portion 28 is generally cylindrical in form and has, at its upper end, a flange 29 (also see FIGURE 4) which projects radially outwardly in the direction of the outer periphery of the first body portion of the washer and is axially displaced from that body portion for purposes which will be explained hereinafter.

Figure 4:
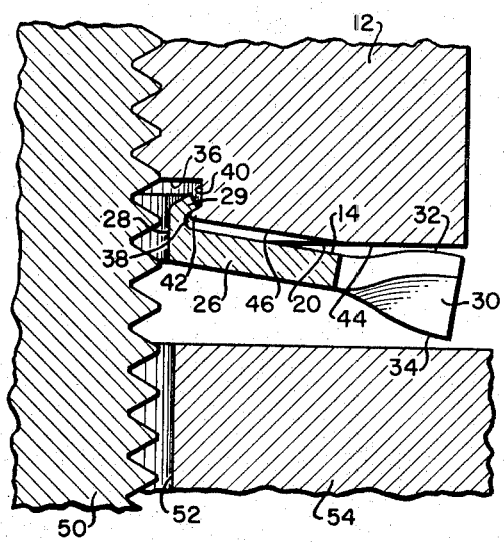
FIGURE 4 is an enlarged fragmentary sectional view of the unit of FIGURE 1 threaded upon a mating stud, but not yet in cooperative engagement with a workpiece.

A plurality of locking teeth 30 are integral with the outer periphery of the first body portion 26 of the lock washer and project radially outwardly therefrom, the locking teeth 30 being twisted relative to the first body portion 26 so as to present upper and lower locking edges 32 and 34, respectively, displaced axially from the first body portion (also see FIGURE 4).

Figure 3:
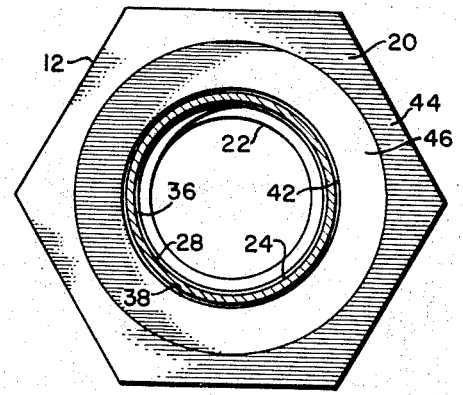
FIGURE 3 is a cross-sectional view taken along line 3—3 of FIGURE 1.

In order to retain lock washer 14 in assembled relationship with nut 12 in unit 10, the nut is provided with a recess 36 in lower surface 20, the recess 36 extending axially upwardly into the body of the nut from an open mouth 38 (see FIGURE 4) in the direction of upper surface 18 and radially outwardly from the inner boundary of lower surface 20 at aperture 22 toward the outer boundary of lower surface 20 which is at the outer periphery of the nut body to an axially directed peripheral margin 40 which is generally coaxial with aperture 22. The overall diameter of recess 36 exceeds the outside diameter of flange 29 so that the second body portion 28 of the lock washer may be received within the recess. Means shown in the form of a continuous annular lip 42 are provided integral with the nut body at the mouth of the recess and project radially inwardly beneath the flange for retaining the lock washer against disassembly from the nut. The lip 42 passes between the flange 29 and the first body portion 26 with some clearance between the mating parts to allow for the rotation of lock washer 14 relative to nut 12. In addition to the recess 36, the lower surface 20 is provided with a clamping surface 44 lying in a generally radial plane displaced axially below the mouth of the recess, the clamping surface extending from the outer boundary of the lower surface 20 toward the inner boundary of the lower surface, as best seen in FIGURES 1 and 3, and being generally coextensive with the locking teeth 30 of the lock washer 14.

Because it is important that the lock washer 14 not only be secured against disassembly from the nut 12 but also be rotatable relative to the nut prior to clamping the unit against a workpiece, precautions are taken to assure that the upper locking edges 32 of the locking teeth 30, which edges are adjacent the clamping surface 44, will not grip the clamping surface and lock the washer against rotation until the unit 10 is assembled with a mating threaded fastener unit and advanced against a workpiece. It is also advantageous to bring the first lock washer body portion 26 as close to the lower surface 20 as practicable so that the lower surface can provide support to the washer body when unit 10 is threaded onto a complementary element and clamped against a workpiece surface. These ends are accomplished by providing the first body portion 26 of the lock washer with a frusto-conical configuration having an apical angle chosen to compensate for the twist of teeth 30 by maintaining the upper locking edges 32 below the radial plane of the clamping surface and clear of the clamping surface. Additionally, the lower surface 20 is provided with a complementary frusto-conical surface 46 extending upwardly from the clamping surface to the mouth of the recess. Frusto-conical surface 46 is generally coextensive with first body portion 26 of the lock washer and has the same apical angle so as to supply a supporting surface for reinforcing the lock washer body in a manner which will be explained below.

Figure 5:
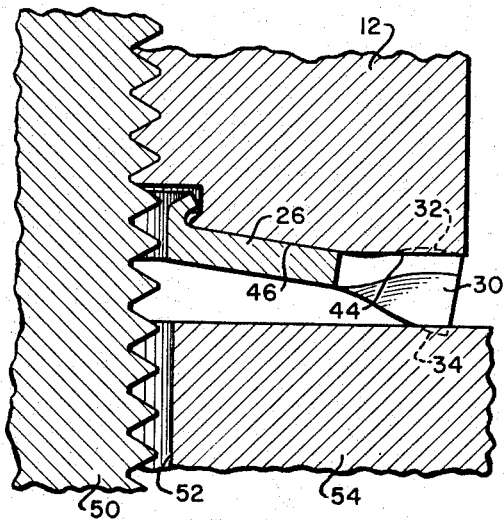
FIGURE 5 is an enlarged fragmentary sectional view similar to FIGURE 4, but with the unit advanced into engagement with the workpiece.

Turning now to FIGURES 4 and 5, unit 10 is seen threaded onto a complementary threaded stud 50 passing through an aperture 52 in a workpiece 54. As the unit is being advanced along the stud, and before the lock washer 14 contacts the workpiece, as seen in FIGURE 4, the washer and nut are rotatable relative to one another, the upper locking edges 32 of the teeth 30 beging clear of the clamping surface 44. When the unit contacts the workpiece, as seen in FIGURE 5, the lock washer is seated against the lower surface 20, with first body portion 26 resting against the frusto-conical surface 46 and upper and lower locking edges 32 and 34 embedded in the nut and the workpiece, respectively. Locking action is obtained through such embedding of the locking edges of teeth 30 and through the elastic reaction forces established as a result of torsional stresses placed upon the locking teeth by the advance of the clamping surface 44 toward the workpiece. These torsional stresses have been found to exert stresses upon the first body portion 26 which tend to twist the first body portion about radial axes aligned with the teeth. Because the first body portion 26 is reinforced by the frusto-conical surface 46 of the lower surface of the nut body, lock washer 14 of unit 10 will resist such twisting so that more efficient locking action will be attained through achieving higher elastic reaction forces at the locking edges of the teeth 30. Furthermore, by precluding the twist of the first body portion 26, the tendency for the second body portion 28 of the lock washer to be pulled out of assembled relationship with the recess 36 by pulling flange 29 downwardly over lip 42 is defeated. Thus, the complementary frusto-conical configurations in the lock washer and in the nut assure that locking edges are presented axially above and below the first lock washer body portion to enable locking action to take place and render such locking action more effective in providing reinforcing support to the first body portion. Additionally, the arrangement aids in maintaining the integrity of the assembly through subsequent reuses of the unit. All of the above is accomplished without diminishing the ability of the lock washer to rotate relative to the nut prior to clamping the unit against a workpiece. It is noted that clamping surface 44 is axially below the mouth 38 of recess 36 and below the frusto-conical surface 46 and the corresponding lock washer body portion 26 so that torsional forces upon the teeth 30 will continue to increase until the teeth are twisted all the way into a radial plane without interference from the remaining portions of the lock washer body or the lower surface 20 of the nut body which might otherwise abut the workpiece surface before the locking teeth are able to exert maximum locking forces upon the engaged unit and stud.

Figure 6:
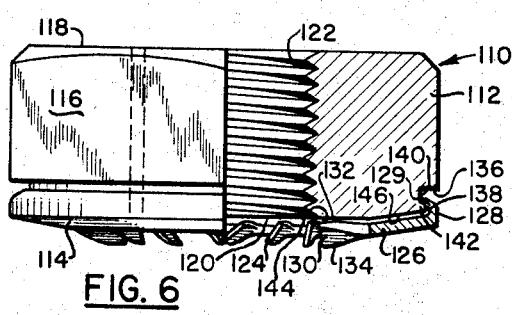
FIGURE 6 is an elevational view, partially sectioned, of another assembled lock washer and threaded fastener unit constructed in accordance with the invention and wherein the fastener member is a nut and the lock washer is an internal toothed lock washer.

Another embodiment is illustrated in FIGURE 6 in the form of assembled threaded fastener and lock washer unit 100 comprised of a nut 112 and an internal tooth lock washer 114.

Nut 112 is similar to nut 12 in that it is hexagonal and is provided with six wrench faces 116, upper and lower surfaces 118 and 120, respectively, and a threaded aperture 122.

Lock washer 114 has a unitary body with a central opening 124, which is generally coaxial with aperture 122, a generally annular, frusto-conical first body portion 126 and a second body portion 128 integral with the first body portion at the outer periphery thereof and extending axially upwardly therefrom. Second body portion 128 is generally cylindrical and has, at its upper end, a flange 129 which projects radially inwardly in the direction of the inner periphery of the first body portion 126.

A plurality of locking teeth 130 are integral with portion 126 and project radially inwardly therefrom, the teeth 30 being twisted to present upper and lower locking edges 132 and 134, respectively.

The lock washer 114 is retained in assembled relationship with the nut 112 by means of the second body portion 128 being received within a recess 136 in the lower surface 120, the recess extending axially upwardly from an open mouth 138 and radially inwardly from the outer perimeter of the nut to inner peripheral margin 140 which is generally coaxial with aperture 120, and annular lip 142 projecting outwardly between flange 129 and body portion 126.

In addition to the recess 136, the lower surface 120 is provided with a clamping surface 144 lying in a generally radial plane displaced axially below the mouth of the recess, extending from the aperture radially outwardly and being coextensive with locking teeth 130, and a frusto-conical surface 146 between the clamping surface and the recess, generally coextensive with the lock washer body portion 126 and complementary to the frusto-conical configuration of the lock washer body portion 126, both surface 146 and portion 126 having essentially the same apical angle. Thus, unit 110 has a construction which achieves the same advantages and meets the same objects as those set forth in the description of unit 10, the units having corresponding portions for corresponding functions.

It will be apparent that either lock washer 14 or 114 could be assembled with a threaded fastener member in the form of a bolt or a machine screw in the same manner as illustrated in the assemblies including nuts 12 and 112. In such instances, the threaded portion of the fastener member would be in the form of a threaded stud rather than a threaded aperture.

The apical angle of the first body portion of the lock washer and the apical angle of the frusto-conical surface of the lower surface of the fastener member are essentially equal. In units of standard dimensions and proportions, it has been found that the most practical nominal value for these apical angles is in the range of approximately 140° to 160°. For example, in a threaded fastener and lock washer unit such as unit 10 fabricated to mate with a threaded stud having a nominal diameter of one-quarter inch, an apical angle of 150° in both the washer body and nut surface has demonstrated desirable results.

It is to be understood that the above detailed description of embodiments of the invention is presented by way of example only. Various details of design and construction may be modified without departing from the true spirit and scope of the invention as set forth in the appended claims.

What is claimed is:

1. An assembled lock washer and threaded fastener unit wherein the lock washer is maintained in assembled relationship with the fastener adjacent a lower surface thereof, the lock washer being positively retained against disassembly from the fastener and readily rotatable relative thereto, said unit comprising:

a fastener member including a body having an outer periphery and an axially extending screw-threaded portion displaced radially inwardly of said outer periphery, the lower surface of the body extending between an inner boundary at the screw-threaded portion and an outer boundary at the outer periphery, the lower surface including a recess having a lowermost mouth and extending axially upwardly into the body from the mouth and radially from one of the lower surface boundaries toward the other of the lower surface boundaries to an axially directed peripheral margin, a clamping surface lying in a generally radial plane displaced axially below the mouth of the recess and extending from said other of the lower surface boundaries toward said one of the lower surface boundaries, and a lock washer having a unitary body with a central opening and an outer periphery and including therebetween a first, generally annular, frusto-conical body portion extending between radially inner and outer peripheries, the first body portion of the lock washer having a radial extent and an apical angle, a second body portion integral with one periphery of the first body portion and extending generally axially therefrom upwardly through the mouth of the recess in the lower surface of the fastener member body, said second body portion including a flange displaced axially above the first body portion and projecting radially toward the other periphery of the first body portion and toward the peripheral margin of the recess, and locking teeth integral with the other periphery of the first body portion, projecting radially therefrom at least partially coextensive with the clamping surface of the fastener member and being twisted relative thereto about an axis projecting substantially parallel to the first body portion to present upper and lower locking edges displaced axially from the first body portion;

means integral with the fastener member body at the mouth of the recess therein and projecting radially beneath the flange of the second body portion of the lock washer about the peripheral margin of the recess along a portion thereof sufficient to retain the lock washer against disassembly from the fastener member; and a frustro-conical surface on the fastener member body extending upwardly from the clamping surface to the mouth of the recess, the frusto-conical surface defining an apical angle corresponding to the apical angle of the first body portion of the lock washer and having a radial extent corresponding to the extent of the first body portion of the lock washer between the inner and outer peripheries thereof;

the apical angle of the first body portion of the lock washer and the corresponding apical angle of the frusto-conical surface of the fastener member body being chosen to maintain the upper locking edges of the locking teeth of the lock washer below the radial plane of the clamping surface and clear of the clamping surface to permit rotation of the lock washer relative to the fastener member.

2. The assembled lock washer and threaded fastener unit of claim 1 wherein
the recess extends radially from the inner boundary of the lower surface outwardly toward the outer boundary of the lower surface to the peripheral margin, and
the clamping surface extends radially from the outer boundary of the lower surface inwardly toward the inner boundary of the lower surface to the lowermost portion of the frusto-conical surface;
the second body portion of the lock washer is integral with the inner periphery of the first body portion thereof and the flange projects radially outwardly, and
the locking teeth project radially outwardly from the outer periphery of the first body portion of the lock washer; and
the means for retaining the lock washer against disassembly from the fastener member projects radially inwardly beyond the outer radial extent of the flange.

3. The assembled lock washer and threaded fastener unit of claim 2 wherein the fastener member is a nut and the axially extending screw-threaded portion is a central aperture passing through the body thereof.

4. The assembled lock washer and threaded fastener unit of claim 3 wherein the nominal apical angle of the frusto-conical surface of the fastener member and the frusto-conical body portion of the lock washer is approximately 140° to 160°.

5. The assembled lock washer and threaded fastener unit of claim 1 wherein
the recess extends axially from the outer boundary of the lower surface inwardly toward the inner boundary of the lower surface to the peripheral margin, and
the clamping surface extends radially from the inner boundary of the lower surface outwardly toward the outer boundary of the lower surface to the lowermost portion of the frusto-conical surface;
the second body portion of the lock washer is integral with the outer periphery of the first body portion thereof and the flange projects radially inwardly, and
the locking teeth project radially inwardly from the inner periphery of the first body portion of the lock washer; and
the means for retaining the lock washer against disassembly from the fastener member projects radially outwardly beyond the inner radial extent of the flange.

6. The assembled lock washer and threaded fastener unit of claim 5 wherein the fastener member is a nut and the axially extending screw-threaded portion is a central aperture passing through the body thereof.

7. The assembled lock washer and threaded fastener unit of claim 6 wherein the nominal apical angle of the frusto-conical surface of the fastener member and the frusto-conical body portion of the lock washer is approximately 140° to 160°.

References Cited

UNITED STATES PATENTS

| 2,225,654 | 12/1940 | Olson | 151—37 |
| 2,715,929 | 8/1955 | Knohl | 151—37 |
| 3,258,048 | 6/1966 | Schmidt | 151—37 |

FOREIGN PATENTS

| 1,315 | 1/1901 | Great Britain. |

EDWARD C. ALLEN, *Primary Examiner.*

CARL W. TOMLIN, *Examiner.*

R. S. BRITTS, *Assistant Examiner.*